US012602815B2

(12) United States Patent
Wang et al.

(10) Patent No.: US 12,602,815 B2
(45) Date of Patent: Apr. 14, 2026

(54) WEAKLY PAIRED IMAGE STYLE TRANSFER METHOD BASED ON POSE SELF-SUPERVISED GENERATIVE ADVERSARIAL NETWORK

(71) Applicant: ZHEJIANG UNIVERSITY, Zhejiang (CN)

(72) Inventors: Yue Wang, Zhejiang (CN); Zexi Chen, Zhejiang (CN); Jiaxin Guo, Zhejiang (CN); Xuecheng Xu, Zhejiang (CN); Yunkai Wang, Zhejiang (CN); Rong Xiong, Zhejiang (CN)

(73) Assignee: ZHEJIANG UNIVERSITY, Zhejiang (CN)

( * ) Notice: Subject to any disclaimer, the term of this patent is extended or adjusted under 35 U.S.C. 154(b) by 279 days.

(21) Appl. No.: 18/411,030

(22) Filed: Jan. 12, 2024

(65) Prior Publication Data

US 2024/0144515 A1 May 2, 2024

Related U.S. Application Data

(63) Continuation of application No. PCT/CN2021/113982, filed on Aug. 23, 2021.

(30) Foreign Application Priority Data

Jul. 14, 2021 (CN) .......................... 202110796509.1

(51) Int. Cl.
G06T 7/70 (2017.01)
G06T 3/40 (2006.01)
(Continued)

(52) U.S. Cl.
CPC ................. *G06T 7/70* (2017.01); *G06T 3/40* (2013.01); *G06T 3/60* (2013.01); *G06T 5/10* (2013.01);
(Continued)

(58) Field of Classification Search
CPC .............. G06T 7/70; G06T 5/10; G06T 11/60
See application file for complete search history.

(56) References Cited

U.S. PATENT DOCUMENTS 10,719,742 B2 * 7/2020 Shechtman .......... G06N 3/0475
2017/0337682 A1 * 11/2017 Liao .......................... G06T 7/30
(Continued)

FOREIGN PATENT DOCUMENTS

CN 111783525 10/2020
CN 111932438 11/2020

OTHER PUBLICATIONS

Zexi Chen et al., "PREGAN: Pose Randomization and Estimation for Weakly Paired Image Style Translation", IEEE Robotics and Automation Letters, Apr. 30, 2021, pp. 2209-2216.
(Continued)

*Primary Examiner* — Edward Park
(74) *Attorney, Agent, or Firm* — JCIPRNET

(57) ABSTRACT

A weakly paired image style transfer method based on a pose self-supervised generative adversarial network, relating to the field of image processing. The method is suitable for style transfer of weakly paired images, different styles of pictures having certain overlap are used to perform model training of an adversarial neural network, so that the model is insensitive to poses and focuses on style learning, and therefore, in an actual application process, a source style can be converted into a target style, but a pose is kept unchanged. In addition, in the model training process of the adversarial neural network, a differentiable pose solver capable of estimating a relative pose of any two images is introduced, a phase correlation algorithm is optimized to be differentiable, and the phase correlation algorithm is embedded into an end-to-end learning network framework to achieve pose estimation.

10 Claims, 5 Drawing Sheets

(51) Int. Cl.
*G06T 3/60* (2006.01)
*G06T 5/10* (2006.01)
*G06T 11/60* (2006.01)
*G06V 10/44* (2022.01)
*G06V 10/74* (2022.01)
*G06V 10/771* (2022.01)

(52) U.S. Cl.
CPC .............. *G06T 11/60* (2013.01); *G06V 10/44* (2022.01); *G06V 10/761* (2022.01); *G06V 10/771* (2022.01)

(56) References Cited

U.S. PATENT DOCUMENTS

| | | |
|---|---|---|
| 2020/0151559 A1 | 5/2020 | Karras et al. |
| 2021/0090302 A1* | 3/2021 | Srivastava .............. G06T 9/002 |
| 2021/0248811 A1* | 8/2021 | Shan ...................... G06N 3/045 |
| 2021/0343030 A1* | 11/2021 | Sagonas ............... G06V 30/414 |
| 2022/0292351 A1* | 9/2022 | Etemad .................... G06T 7/50 |
| 2024/0144515 A1* | 5/2024 | Wang .................... G06V 10/82 |

OTHER PUBLICATIONS

"International Search Report (Form PCT/ISA/210) of PCT/CN2021/113982," mailed on Apr. 13, 2022, pp. 1-5.

* cited by examiner

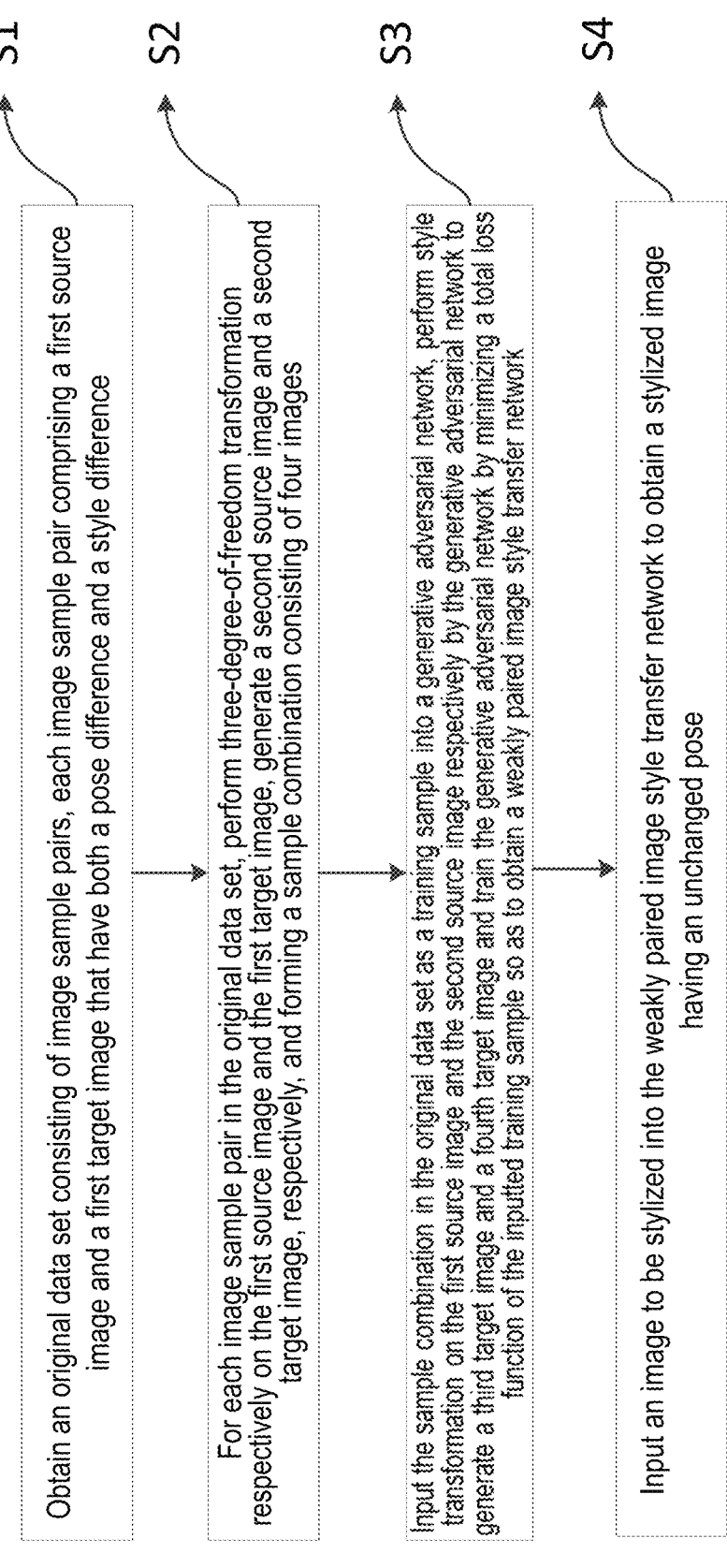

S1

Obtain an original data set consisting of image sample pairs, each image sample pair comprising a first source image and a first target image that have both a pose difference and a style difference

S2

For each image sample pair in the original data set, perform three-degree-of-freedom transformation respectively on the first source image and the first target image, generate a second source image and a second target image, respectively, and forming a sample combination consisting of four images

S3

Input the sample combination in the original data set as a training sample into a generative adversarial network, perform style transformation on the first source image and the second source image respectively by the generative adversarial network to generate a third target image and a fourth target image and train the generative adversarial network by minimizing a total loss function of the inputted training sample so as to obtain a weakly paired image style transfer network

S4

Input an image to be stylized into the weakly paired image style transfer network to obtain a stylized image having an unchanged pose

FIG. 1

WEAKLY PAIRED IMAGE STYLE TRANSFER METHOD BASED ON POSE SELF-SUPERVISED GENERATIVE ADVERSARIAL NETWORK

CROSS-REFERENCE TO RELATED APPLICATION

This application is a continuation of international PCT application serial no. PCT/CN2021/113982, filed on Aug. 23, 2021, which claims the priority benefit of China application serial no. 202110796509.1, filed on Jul. 14, 2021. The entirety of each of the abovementioned patent applications is hereby incorporated by reference herein and made a part of this specification.

BACKGROUND

Technical Field

The disclosure belongs to the field of computer vision style transfer, and in particular, relates to style transfer of pictures through a pose self-supervised generative adversarial network.

Description of Related Art

Image style transfer gives a robot a higher-level understanding of the environment and helps the robot adapt to different scenarios. Therefore, tasks trained or set on one scenario may be easily performed on other scenarios through this transfer learning. This setup is considerably helpful for a variety of robotic tasks, such as transferring training of detectors from sunny days to rainy nights, as well as location re-identification and cross-domain semantic segmentation.

At present, during the training process of image style transfer networks, most of the works focus on completely paired image style transfer or completely unpaired image style transfer. In paired image transfer, the content of two images from two styles is exactly the same. To handle this task, Pix2Pix provides a solution based on a generative adversarial network (GAN), and good performance is achieved. However, in most robotics applications, obtaining perfectly paired data is unrealistic. In order to solve this problem, CycleGAN can use unpaired images to train the style transfer model. However, its shortcomings are also obvious, mainly in the following two aspects. (1) The boundary between learned content and style may be blurred, leading to failure of style transfer because these unsupervised methods ignore the precision brought by supervised methods. (2) Extensive use of cycle consistency leads to difficulties in training.

However, there is an intermediate area between the fully paired and fully unpaired data that can be exploited to make up for the above shortcomings. In robotic tasks, through various types of sensors, even though it is difficult to collect completely paired data, it is feasible to collect data with a large amount of overlap, which is called weakly paired data in the disclosure. Since the data acquired by robots are generally images, for data acquired by robot sensors, weakly paired data are weakly paired images. Considering the definition of weakly paired data, a style transfer device trained on weakly paired data can effectively improve the completion of robot tasks between different domains.

For paired data, two pictures with different styles have perfectly aligned content. For unpaired data, the two pictures are unrelated in the data. For weakly paired data, the content is similar but misaligned in pose. Since the robot carries multiple sensors to sense geometric measurements, a rough alignment of images of different styles is reasonable, and therefore we believe that such a setting is worth handling.

We describe weakly paired image style transfer as the process of generating the target image $I_t$ using the original image $I_o$.

$$I_t = T(f(I_o), \xi),$$

where f and T are the style transfer process and the geometric transformation process of the image, and $\xi$ is the relative pose between the two images, which is the parameter of T.

The purpose of weakly paired data style transfer is to learn a network $N_f$, approximate f from the data set $I_o$, $I_t$, and thereby use $N_f$ to transfer the original image. The challenge of this problem is how to keep the learned function $N_f$ to only transfer the style without changing the pose of the original image. Simply learning a network $N_f$ between two images will obviously lead to the entanglement of style, pose, and content. On the other hand, treating image pairs as unpaired does not exploit the information of bounded $\xi$, leaving much room for improvement. Leaving aside the fully-supervised methods of paired images, in the unsupervised methods, it is easy to be confused by the complex relative poses between weakly paired images and miss the advantages brought by pixel-level correspondence.

SUMMARY

The disclosure aims to solve the problem in the related art that the style cannot be transferred without changing the original image pose during style transfer and to provide a weakly paired image style transfer method based on a pose self-supervised generative adversarial network.

In order to solve the problem of weakly paired image style transfer, the disclosure provides a random pose estimation adversarial neural network (PREGAN). The balance point of GAN is the match between the distribution of generated data and the distribution of target data. By leveraging pose injection and pose recovery as domain randomization and self-supervision, the generative adversarial process is expected to be pose-insensitive and focus on style learning. The specific technical solutions adopted by the disclosure are provided as follows.

The disclosure provides a weakly paired image style transfer method based on a pose self-supervised generative adversarial network, and the method includes the following steps.

In S1, an original data set consisting of image sample pairs is obtained. Each image sample pair includes a first source image $O_1$ and a first target image $T_1$ that have both a pose difference and a style difference.

In S2, for each image sample pair in the original data set, three-degree-of-freedom transformation $P_r$ is performed respectively on the first source image $O_1$ and the first target image $T_1$, a second source image $O_2$ and a second target image $T_2$ are generated respectively, and a sample combination consisting of four images is formed. The three-degree-of-freedom transformation $P_r$ includes three randomly generated pose transformations including horizontal and vertical translation and rotation. Further, the three-degree-of-freedom transformation $P_r$ adopted by the first source image $O_1$ and the first target image $T_1$ in the same image sample pair remains the same.

In S3, the sample combination in the original data set is inputted as a training sample into a generative adversarial network, style transformation is performed on the first source image $O_1$ and the second source image $O_2$ respectively by the generative adversarial network to generate a third target image $FakeT_1$ and a fourth target image $FakeT_2$, and the generative adversarial network is trained by minimizing a total loss function of the inputted training sample, so as to obtain a weakly paired image style transfer network.

In the total loss function, a loss function L of a single training sample consists of three parts:

$$L=L_D+L_S+L_M,$$

where a loss of a first part is $L_D=(T_1-FakeT_1)+(T_2-FakeT_2)$, a loss of a second part is $L_S=P_3-P_4$, and a loss of a third part is $L_M=P_r-P_e e$.

In the formula: $P_3$ is a relative pose between the third target image $FakeT_1$ and the first target image $T_1$, $P_4$ is a relative pose between the fourth target image $FakeT_2$ and the second target image $T_2$, and P e is a relative pose between the third target image $FakeT_1$ and the fourth target image $FakeT_2$.

In S4, an image to be stylized is inputted into the weakly paired image style transfer network to obtain a stylized image having an unchanged pose.

Preferably, images in the original data set are all bird's-eye views of a running path of a robot.

Further, a method of constructing the original data set is as follows:

In a first image acquisition environment, a first bird's-eye view at a random location A on the running path of the robot is acquired.

(1) Random translation is applied to the random location A to obtain a random location B in a second image acquisition environment different from the first image acquisition environment.

(2) Horizontal rotation is randomly applied to an acquisition viewing angle, and then a second bird's-eye view is acquired at the random location B again.

(3) The acquired first bird's-eye view and the second bird's-eye view are respectively treated as the first source image $O_1$ and the first target image $T_1$ to construct one image sample pair.

Continuously repeating (1), (2) and (3) to obtain a series of image sample pairs to construct the original data set.

Further, a difference between the first image acquisition environment and the second image acquisition environment is that the weather is different or sensors used to acquire images are different.

Further, the original data set is constructed by obtaining a bird's-eye view in a simulation environment.

Preferably, the relative pose between any two images is solved by a differentiable pose solver.

Preferably, the differentiable pose solver includes 8 different U-Net networks. The steps for image pose estimation of the first image and the second image in the differentiable pose solver are as follows:

In S101, a pre-trained first U-Net network and a second U-Net network are treated as two feature extractors, the first image and the second image are treated as original input pictures of the two feature extractors, and isomorphic features in the two original input pictures are extracted to obtain a first feature map and a second feature map that are isomorphic.

In S102, Fourier transform is performed on the first feature map and the second feature map obtained in S101, and their amplitude spectra are then obtained.

In S103, log-polar coordinate transformation is performed on the two amplitude spectra obtained in S102, so that the amplitude spectra are converted from a Cartesian coordinate system to a log-polar coordinate system, and that rotation transformation in the Cartesian coordinate system between the two amplitude spectra is mapped to translation transformation in a y direction in the log-polar coordinate system.

In S104, phase correlation solution is performed on the amplitude spectra after the coordinate transformation between the two in S103 to obtain a translation transformation relationship between the two, and reconversion is performed according to the mapping relationship between the Cartesian coordinate system and the log-polar coordinate system in S103 to obtain a rotation transformation relationship between the first image and the second image.

In S105, a pre-trained third U-Net network and a fourth U-Net network are treated as two feature extractors, the first image and the second image are treated as original input pictures of the two feature extractors, and isomorphic features in the two original input pictures are extracted to obtain a third feature map and a fourth feature map that are isomorphic.

In S106, Fourier transform is performed on the third feature map and the fourth feature map obtained in S105, and their amplitude spectra are then obtained.

In S107, log-polar coordinate transformation is performed on the two amplitude spectra obtained in S106, so that the amplitude spectra are converted from the Cartesian coordinate system to the log-polar coordinate system, and that scaling transformation in the Cartesian coordinate system between the two amplitude spectra is mapped to translation transformation in a x direction in the log-polar coordinate system.

In S108, phase correlation solution is performed on the amplitude spectra after the coordinate transformation between the two in S107 to obtain the translation transformation relationship between the two, and reconversion is performed according to the mapping relationship between the Cartesian coordinate system and the log-polar coordinate system in S107 to obtain a scaling transformation relationship between the first image and the second image.

In S109, corresponding rotation and scaling transformation is performed on the second image according to the rotation transformation relationship and the scaling transformation relationship obtained in S104 and S108 to obtain a new second image.

In S1010, a pre-trained fifth U-Net network and a sixth U-Net network are treated as two feature extractors, the first image and the new second image are treated as original input pictures of the two feature extractors, and isomorphic features in the two original input pictures are extracted to obtain a fifth feature map and a sixth feature map that are isomorphic.

In S1011, phase correlation solution is performed on the fifth feature map and sixth feature map obtained in S1010 to obtain the translation transformation relationship in the x direction between the first image and the second image.

In S1012, a pre-trained seventh U-Net network and an eighth U-Net network are treated as two feature extractors, the first image and the new second image are treated as original input pictures of the two feature extractors, and isomorphic features in the two original input pictures are extracted to obtain a seventh feature map and an eighth feature map that are isomorphic and only retain the translation transformation relationship between the original input pictures.

In S1013, phase correlation solution is performed on the seventh feature map and eighth feature map obtained in S1012 to obtain the translation transformation relationship in the y direction between the first image and the second image, and relative pose estimation between the first image and the second image including the three transformation relationships of rotation, scaling, and translation is completed.

Further, in the differentiable pose solver, the 8 U-Net networks are trained in advance, and the total loss function of the training is a weighted sum of a rotation transformation relationship loss, a scaling transformation relationship loss, a translation transformation relationship loss in the x direction, and a translation transformation relationship loss in the y direction between the first image and the second image.

Preferably, the original data set is inputted into the generative adversarial network in batches for training.

Preferably, the generative adversarial network uses an ADAM optimizer to perform gradient descent during a training process to optimize a network parameter.

BRIEF DESCRIPTION OF THE DRAWINGS

FIG. 1 is a chart of a method provided by the disclosure breaking down into steps.

DESCRIPTION OF THE EMBODIMENTS

Figure 2:
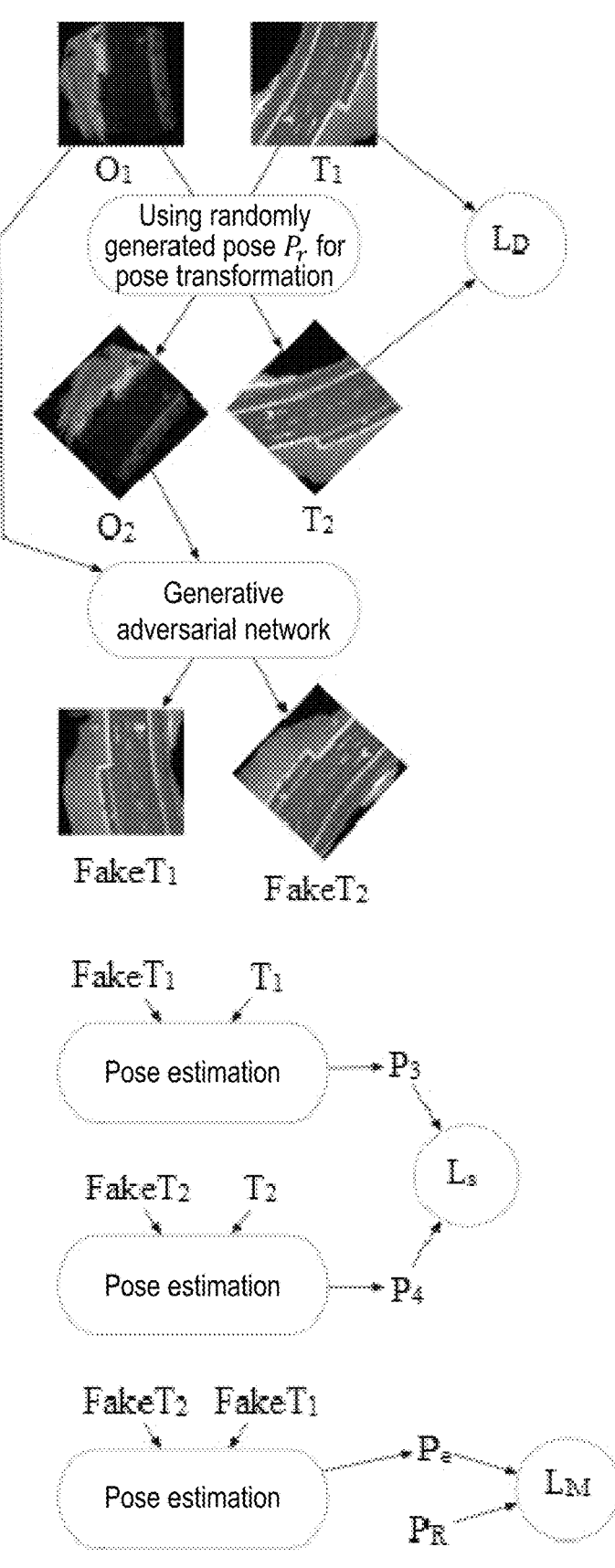
FIG. 2 is network flow view of the method provided by the disclosure.

The disclosure is further elaborated and described together with accompanying drawings and specific embodiments in the following paragraphs. The technical features of various embodiments of the disclosure may be combined accordingly as long as they do not conflict with each other.

As shown in FIG. 1, the disclosure provides a weakly paired image style transfer method based on a pose self-supervised generative adversarial network, and the method includes the following steps.

In S1, an original data set consisting of a series of image sample pairs is obtained, and each image sample pair includes two images, namely a first source image $O_1$ and a first target image $T_1$, that have both a pose difference and a style difference. The number of image sample pairs in the original data set shall meet the subsequent network training requirements and can be adjusted based on actual conditions.

In S2, in order to meet subsequent training needs, a pose transformation operation is performed on each image sample pair in the original data set, and the specific method is as follows. For each set of image samples, each of the first source image $O_1$ and the first target image $T_1$ undergoes a three-degree-of-freedom transformation $P_r$. An image generated after the first source image $O_1$ undergoes the three-degree-of-freedom transformation $P_r$ is denoted as a second source image $O_2$, and an image generated after the first target image $T_1$ undergoes the three-degree-of-freedom transformation $P_r$ is denoted as a second target image $T_2$. In this way, the first source image $O_1$, the first target image $T_1$, the second source image $O_2$, and the second target image $T_2$ together form a sample combination consisting of four images. After each image sample pair in the original data set undergoes such a pose transformation operation, the original data set is expanded into a data set containing a series of sample combinations.

It should be noted that the above three-degree-of-freedom transformation $P_r$ shall include 3 different degrees of freedom, namely two translational degrees of freedom and one rotational degree of freedom. Further, in order to ensure the reliability of model training, these applied transformations shall be random. That is, the three-degree-of-freedom transformation $P_r$ includes three randomly generated pose transformations including horizontal and vertical translation and rotation. Further, the three-degree-of-freedom transformation $P_R$ used by the first source image $O_1$ and the first target image $T_1$ in the same image sample pair shall remain the same. That is, a three-degree-of-freedom transformation $P_R$ is randomly generated and then applied to the first source image $O_1$ and the first target image $T_1$ at the same time. However, since the three-degree-of-freedom transformation $P_R$ is randomly generated, the three-degree-of-freedom transformation $P_R$ applied to different image sample pairs is generally different.

After the abovementioned operation of S2, the input first source image $O_1$ and the first target image $T_1$ undergo a unified and randomly generated three-degree-of-freedom transformation $P_R$ of horizontal and vertical translation and rotation, and the second source image $O_2$ and the second target image $T_2$ are obtained. At this time, for any sample combination, the first source image $O_1$ and the second source image $O_2$ have a same style, and the first target image $T_1$ and the second target image $T_2$ have a same style. It is assumed that a relative pose between the first source image $O_1$ and the first target image $T_1$ is P1, and the relative pose P1 between the input first source image $O_1$ and the first target image $T_1$ is unknown. A relative pose between the second source image $O_2$ and the second target image $T_2$ is P2, then $P_1=P_2$. Moreover, since the same three-degree-of-freedom transformation is applied, the relative poses between the first source image $O_1$ and the second source image $O_2$ and between the first target image $T_1$ and the second target image $T_2$ are both $P_R$. A subsequent generative adversarial network may be trained based on the style and pose difference characteristics between the four images in these sample combinations, so that it can focus on identifying the style without changing the pose.

In S3, the sample combination in the original data set is inputted as a training sample into a generative adversarial network (GAN). For each training sample, when the training sample is inputted into the generative adversarial network, the generative adversarial network performs style transformation on the first source image $O_1$ and the second source image $O_2$ respectively to correspondingly generate a third target image $FakeT_1$ from the first source image $O_1$ and a fourth target image $FakeT_2$ from the second source image $O_2$. The generative adversarial network is trained by minimizing a total loss function of the inputted training sample, so as to obtain a weakly paired image style transfer network.

In the generative adversarial network, the first source image $O_1$ and the second source image $O_2$ are used as content images, while the third target image $FakeT_1$ and the fourth target image $FakeT_2$ are used as style images. The generative adversarial network is a deep learning model that generates output that meets the requirements through mutual game learning between two modules, namely a generative model and a discriminative model. The specific structure of the generative adversarial network belongs to the related arts so description thereof is not repeated herein.

The total loss function of the training sample is obtained by summing the losses of all training samples inputted to the generative adversarial network. In the disclosure, it is preferable to input the original data set into the generative adversarial network in batches for iterative training, and an ADAM optimizer is used to perform gradient descent during each round of training to optimize a network parameter. Therefore, a total loss function value is the sum of the loss values of all training samples inputted in each round.

The structure and training process of the entire generative adversarial network may be found with reference to FIG. 2. For a single training sample, its loss function L consists of three parts, which are described in detail as follows:

1) The first source image $O_1$ and the second source image $O_2$ are simultaneously passed through the generative adversarial network GAN used for style transformation to obtain the third target image $FakeT_1$ and the fourth target image $FakeT_2$. Therefore, theoretically speaking, at this time, the poses of the content in the third target image $FakeT_1$ and the fourth target image $FakeT_2$ shall be the same as the first source image $O_1$ and the second source image $O_2$, but the style of their content shall be consistent with the style of the first target image $T_1$ and the second target image $T_2$. It is thus obtained that the first part of the loss is a sum of an error loss of the first target image $T_1$ and the third target image $FakeT_1$ and an error loss of the second target image $T_2$ and the fourth target image $FakeT_2$, and the formula is as follows:

$$L_D=(T_1-FakeT_1)+(T_2-FakeT_2).$$

2) In order to train the abovementioned generative adversarial neural network, it can reasonably convert the styles of the first source image $O_1$ and the second source image $O_2$ into the styles of the first target image $T_1$ and the second target image $T_2$ without being interfered by complex poses. A relative pose $P_3$ between the third target image $FakeT_1$ and the first target image $T_1$ and a relative pose $P_4$ between the fourth target image $FakeT_2$ and the second target image $T_2$ can be solved. Herein, if the generative adversarial neural network can successfully convert the style without being interfered by pose transformation, theoretically $P_3=P_4$. It can be seen that the second part of the loss is an error loss of the relative pose between the two sets of target images, and the formula is as follows:

$$L_S=P_3-P_4,$$

in the formula, $P_3$ is the relative pose between the third target image $FakeT_1$ and the first target image $T_1$, and $P_4$ is the relative pose between the fourth target image $FakeT_2$ and the second target image $T_2$.

3) Even if P1 is unknown, the randomly generated $P_R$ for each set of image samples is known, that is, the relative poses between $O_1$ and $O_2$, $T_1$ and $T_2$, and $FakeT_1$ and $FakeT_2$ shall all be $P_R$. If a relative pose P e between $FakeT_1$ and $FakeT_2$ is still equal to $P_R$, it means that the adversarial neural network has resisted the interference of the relative poses between $O_1$ and $T_1$ and between $O_2$ and $T_2$. It thus can be seen that the third part of the loss is:

$$L_M=P_R-P_e,$$

in the formula, $P_e$ is the relative pose between the third target image $FakeT_1$ and the fourth target image $FakeT_2$.

The final loss function L of a single training sample consists of three parts:

$$L=L_D+L_S+L_M.$$

After the network training under the above loss function, after the training is completed, the generative adversarial network may be used as a weakly paired image style transfer network to perform a style transfer task of paired images.

In S4, an image to be stylized is inputted into the weakly paired image style transfer network obtained through training to obtain a stylized image having an unchanged pose.

The abovementioned method including S1 to S4 may theoretically be applied to a style transfer work of any weakly paired images, so that the content image is stylized while ensuring that the image pose is kept unchanged. One valuable application scenario is to stylize images acquired by sensors mounted on a robot. The application of the above method in this specific scenario is described in detail in the following paragraphs for ease of understanding.

During the movement of a robot, different data obtained by multiple sensors need to be integrated to understand the environment. However, the images acquired by the sensors on the robot are limited by the sensor type or the influence of factors such as light and interference in the environment, so that there must be a variety of style differences or pose differences. Therefore, image style transfer learning is needed to give the robot a deep understanding of the surrounding environment, help the robot adapt to different scene changes, and make the robot tasks trained or configured in one scene applicable to other scenes.

Figure 3:
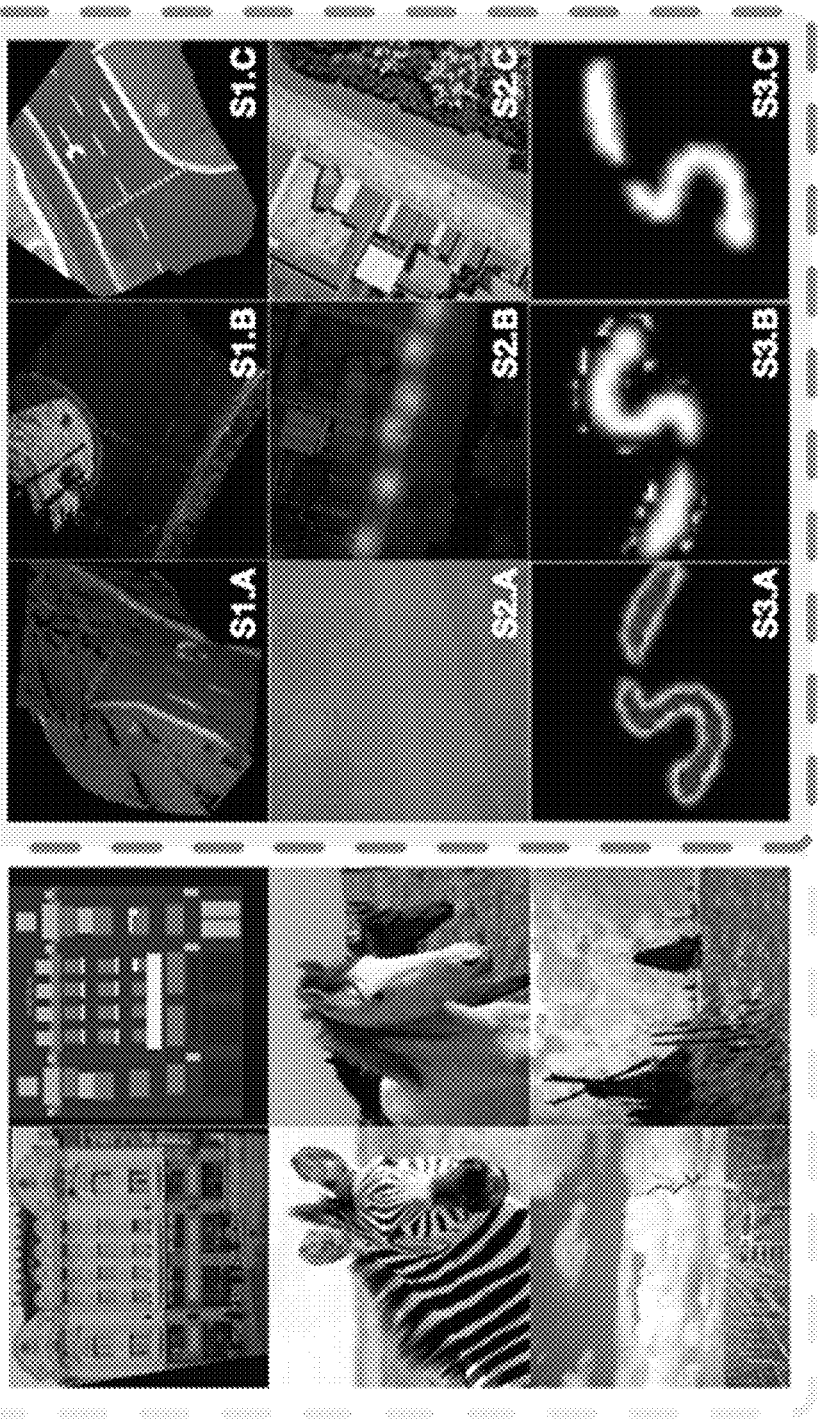
FIG. 3 is comparison among weakly paired images, fully paired images, and unpaired images.

FIG. 3 shows a typical example of fully paired, unpaired, and weakly paired images provided by the disclosure, where among the three sets of images, on the left part, the upper set is fully matched data, the middle set and the lower set are unmatched data, and S1.A to S1.C, S2.A to S2.C, and S2.A to S2.C on the right part are weakly matched data. As can be seen from the figure, for paired data, the two pictures with different styles have perfectly aligned content. For unpaired data, the two pictures are unrelated in the data. For weakly paired data, the content is similar but misaligned in pose. In the methods described in S1 to S4 above, it can be learned that a generative adversarial network can transfer the original image, and only the style is transferred during the transfer process without changing the pose of the original image.

In a robot self-positioning task, a typical image that needs to be obtained during the movement of the robot is a bird's-eye view of a running path of the robot. Therefore, the images in the original data set in the disclosure may be a bird's-eye view of the running path of the robot. Through the abovementioned weak paired image style transfer, a stylized image with unchanged pose is obtained, allowing the robot to adapt to different environments through training. For a bird's-eye view, the original data set may be constructed through the following steps:

(1) First, in a first image acquisition environment, a first bird's-eye view is acquired at a random location A on the running path of the robot.

(2) In a second image acquisition environment different from the first image acquisition environment, random translation is applied to the random location A to obtain a random location B. Horizontal rotation is randomly applied to an acquisition viewing angle, and then a second bird's-eye view is acquired at the random location B again.

(3) Finally, the acquired first bird's-eye view and the second bird's-eye view are respectively treated as the first source image $O_1$ and the first target image $T_1$ to construct one image sample pair.

By continuously repeating the above (1) to (3) process, a series of image sample pairs can be obtained and then constructed as the original data set.

Figure 4:
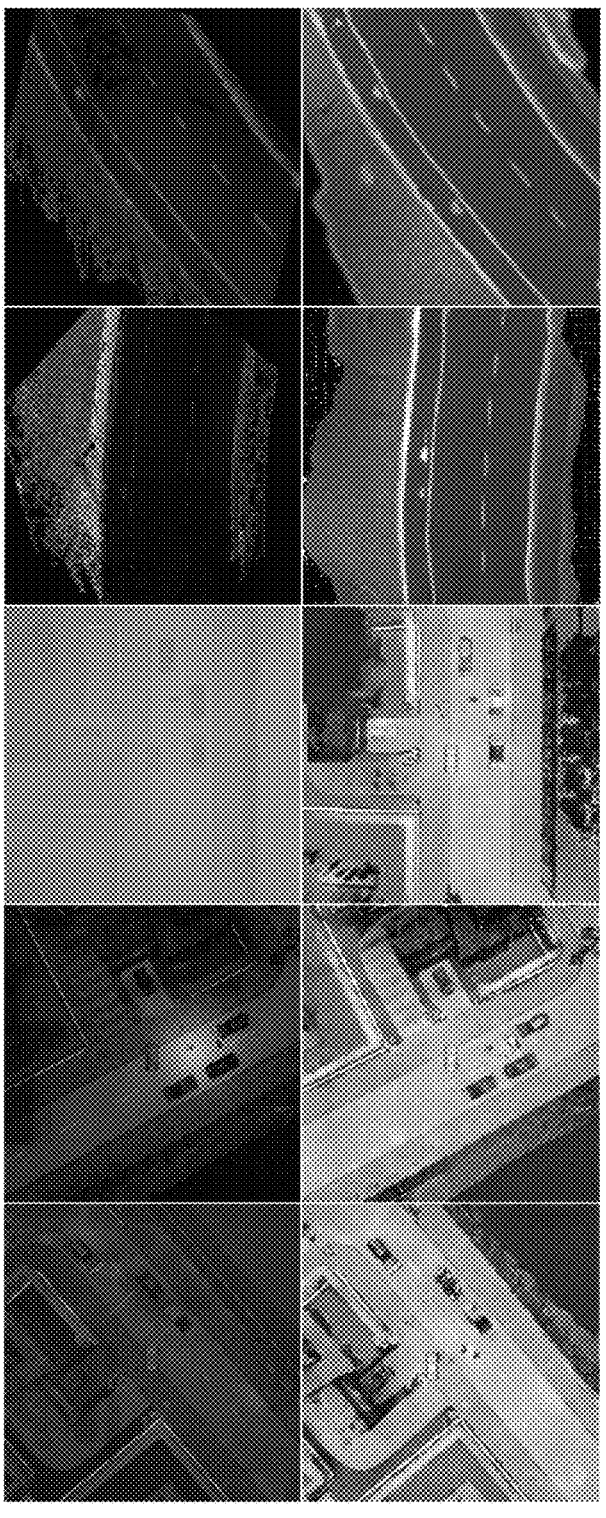
FIG. 4 illustrates rendered images of image style transfer using this method.

It should be noted that a difference between the above-mentioned first image acquisition environment and the second image acquisition environment may be diverse, and the difference may generally be set to be that the weather is different or sensors used to acquire images are different. For instance, FIG. 4 shows five image sample pairs obtained under five different differential settings, from top to bottom are: 1) migration of a binocular view to a drone's viewing angle (different sensors); 2) migration from lidar to a drone's viewing angle (different sensors); migration from foggy day to sunny day (different weather); 4) migration from night to sunny day (different weather); and 5) migration from rainy day to sunny day (different weather).

Since it is difficult to obtain such data in a real scene, it is preferable to perform simulation in a simulation environment to obtain a bird's-eye view to construct an original data set in the disclosure. The advantage of simulation is that a large number of sample pairs can be obtained without limit, and the training accuracy of the model can be improved.

Certainly, the bird's-eye view is only one of the image forms, and the disclosure may also be used in other types of image weakly paired image style transfer tasks, which is not limited herein.

Further, during the calculation process of the above loss function L, the relative poses $P_3$, $P_4$, and $P_e$ need to be estimated and cannot be calculated directly. Such estimation may be achieved through a differentiable pose solver.

In a preferred embodiment of the disclosure, a differentiable pose solver for solving the relative pose between any two images is further provided, which is essentially a differentiable phase correlation algorithm. Phase correlation is a similarity-based matcher that performs well for inputs with the same modality, but can only complete matching with small high-frequency noise. We optimize the phase correlation algorithm to be differentiable and embed it into our end-to-end learning network framework to form a differentiable pose solver. This architecture enables our system to find the optimal feature extractor for the results of image matching. To be specific, in the disclosure, conventional phase correlation is adopted, and a fast Fourier transform layer (FFT), a log-polar transform layer (LPT), and the phase correlation layer (DC) are endowed with differentiable properties, so that they can be used for training of the end-to-end differentiable pose solver.

Figure 5:
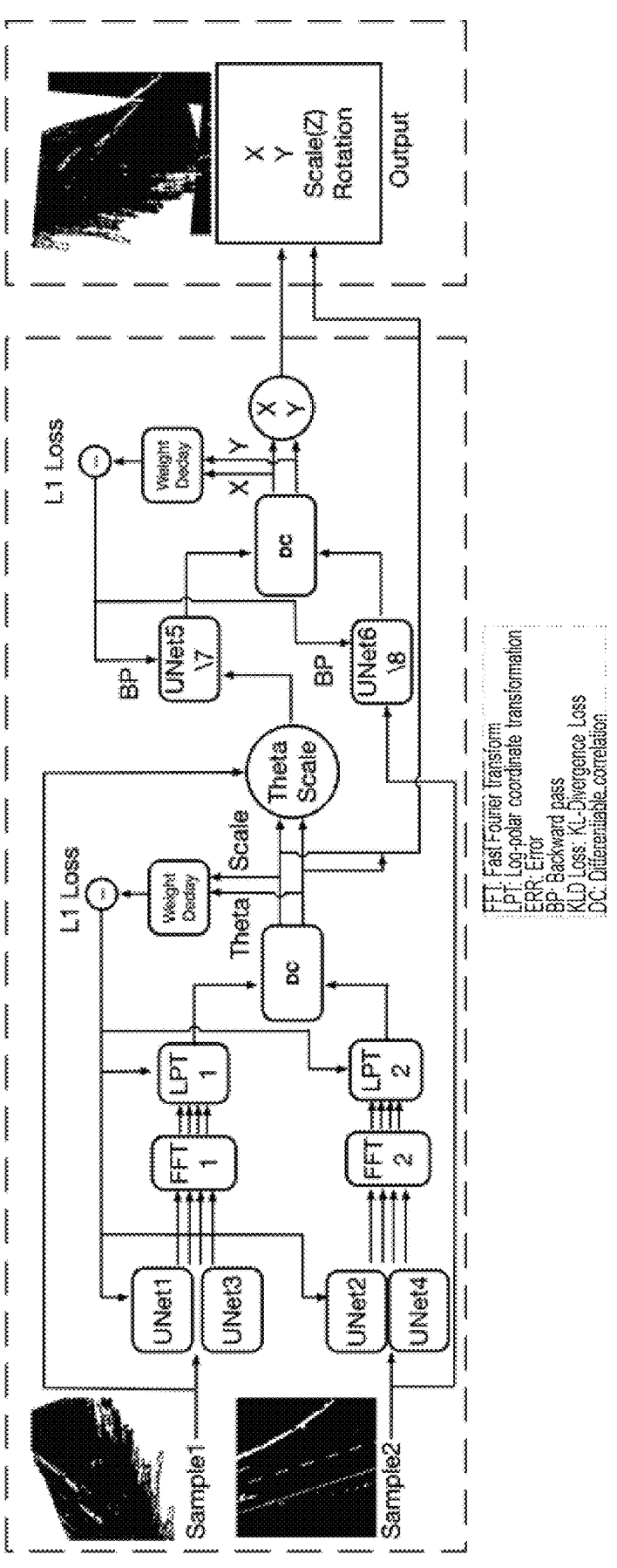
FIG. 5 is a schematic diagram of the structure of a differentiable pose solver.

As shown in FIG. 5, the differentiable pose solver contains 8 different U-Net networks. For convenience of description, the two images that need to be solved for relative pose are denoted as a first image Sample1 and a second image Sample2. There are differences in content and pose between these two images, so they are heterogeneous images. Its core is 8 independent U-Net networks as well as a Fourier transform layer (FFT), a log-polar transform layer (LPT), and a phase correlation layer (DC). The input of the differentiable pose solver is the abovementioned first image and second image that are heterogeneous, and its final output is three pose transformation relationships between the first image and the second image, namely translation, rotation, and scaling.

The steps for image pose estimation of the first image and the second image in the differentiable pose solver are as follows:

In the conventional phase correlation algorithm, a high-pass filter is used to suppress the random noise of the two inputs, and this process may be regarded as a feature extractor. However, for a pair of input heterogeneous images, there are obvious changes between the two, and one high-pass filter is not enough. Considering that there are no common features to directly supervise the feature extractor, end-to-end learning is used in the disclosure to solve this problem. In the disclosure, 8 independent trainable U-Net networks (denoted as U-Net1 to U-Net8) are constructed for the first image and the second image in the rotation and scaling stage and the translation stage These eight U-Net networks are pre-trained under the supervision of three types of losses: translation, rotation, and scaling, and can extract isomorphic features, that is, common features, from heterogeneous images. In this way, the relative pose required to convert two heterogeneous images into two isomorphic feature maps can be estimated. In the disclosure, if there are only four U-Net networks, then the solutions for the two transformations of rotation and scaling need to be coupled and the solutions for x-direction translation and y-direction translation also need to be coupled, so that the features extracted by the trained feature extractor may not be effective. Therefore, we decouple rotation, scaling, x translation, and y translation and train their respective U-Net networks, resulting in a total of 8 U-Net networks to achieve the effect of improving accuracy.

In this embodiment, for eight independent U-Net networks, the input and output sizes are each 256×256. Each U-Net network consists of 4 downsampling encoder layers and 4 upsampling decoder layers to extract features. As training proceeds, the parameters of the 8 U-Nets will be adjusted. Please note that this network is lightweight, so it is efficient enough in real-time to meet the requirements of the application scenario.

Besides, the function of the Fourier transform layer (FFT) is to perform Fourier transform on the feature maps extracted by the U-Net networks and remove the translation transformation relationship between images but retain the rotation and scaling transformation relationships. This is because according to the characteristics of Fourier transform, only rotation and scaling have an impact on the amplitude of the spectrum, but the amplitude of the spectrum is not sensitive to translation. Therefore, after FFT is introduced, a representation method that is insensitive to translation but particularly sensitive to scaling and rotation is obtained, so translation may be ignored when scaling and rotation are solved.

In addition, the function of the log-polar transformation layer (LPT) is to perform log-polar coordinate transformation on the FFT transformed image and map the image from a Cartesian coordinate system to a log-polar coordinate system. In this mapping process, scaling and rotation in the Cartesian coordinate system may be converted into translations in the log-polar coordinate system. This coordinate system transformation yields a form of cross-correlation with respect to scaling and rotation, eliminating all exhaustiveness evaluations in the entire differentiable pose solver.

In addition, the role of the phase correlation layer (DC) is to perform phase correlation solution, that is, to calculate the cross-correlation between two amplitude spectra. According to the correlation obtained by solving the phase correlation, the translation transformation relationship between the two may be obtained. The specific calculation process of cross-correlation belongs to the related, so description thereof is not provided herein.

The specific structure of the differentiable pose solver and the pose estimation process are described in detail in the following paragraphs, and the steps are as follows:

In S101, a pre-trained first U-Net network U-Net1 and a second U-Net network U-Net2 are treated as two feature extractors, the first image and the second image that are heterogeneous are treated as original input pictures of the two feature extractors U-Net1 and U-Net2 (that is, the first image is inputted into U-Net1 and the second image is inputted into U-Net2, and the same below), and isomorphic features in the two original input pictures are extracted to obtain a first feature map and a second feature map that are isomorphic. At this time, the translation, rotation, and scaling transformation relationships between the original input pictures are retained in the first feature map and the second feature map at the same time.

In S102, a first Fourier transform operation (denoted as FFT1) is performed on the first feature map and the second feature map obtained in S101, and then their amplitude spectra are obtained. At this time, the rotation and scaling transformation relationships between the original input pictures are retained between the two amplitude spectra, but the translation transformation relationship has been filtered out in FFT1.

In S103, a first log-polar coordinate transformation operation (denoted as LPT1) is performed on the two amplitude spectra obtained in S102, so that the amplitude spectra are converted from a Cartesian coordinate system to a log-polar coordinate system, and that rotation transformation in the Cartesian coordinate system between the two amplitude spectra is mapped to translation transformation in a y direction (denoted as Y) in the log-polar coordinate system.

In S104, phase correlation solution is performed on the amplitude spectra after the coordinate transformation between the two in S103 in the phase correlation layer (DC) to obtain the translation transformation relationship between the two. It should be noted that in LPT1 of S103, there is a mapping relationship between the rotation transformation in the Cartesian coordinate system and the translation transformation Y in the y direction in the log-polar coordinate system. Therefore, the translation transformation relationship may be reconverted according to the mapping relationship between the Cartesian coordinate system and the log-polar coordinate system in S103 to obtain the rotation transformation relationship between the first image and the second image.

The above rotation transformation relationship is essentially an angle theta that needs to be rotated by the second image to achieve registration with the first image. This angle may be used as part of the relative pose estimation.

In S105, similarly, a pre-trained third U-Net network U-Net3 and a fourth U-Net network U-Net4 are treated as two feature extractors, the first image and the second image that are heterogeneous are treated as original input pictures of the two feature extractors U-Net3 and U-Net4, and isomorphic features in the two original input pictures are extracted to obtain a third feature map and a fourth feature map that are isomorphic. At this time, the translation, rotation, and scaling transformation relationships between the original input pictures are also retained in the third feature map and the fourth feature map at the same time.

In S106, a second Fourier transform operation (denoted as FFT2) is performed on the third feature map and the fourth feature map obtained in S105, and then their amplitude spectra are obtained. Similarly, the rotation and scaling transformation relationships between the original input pictures are retained between the two amplitude spectra, but the translation transformation relationship has been filtered out in FFT2.

In S107, a second log-polar coordinate transformation (denoted as LPT2) is performed on the two amplitude spectra obtained in S106, so that the amplitude spectra are converted from the Cartesian coordinate system to the log-polar coordinate system, and that scaling transformation in the Cartesian coordinate system between the two amplitude spectra is mapped to translation transformation X in a x direction in the log-polar coordinate system.

In S108, phase correlation solution is performed on the amplitude spectra after the coordinate transformation between the two in S107 in the phase correlation layer (DC) to obtain the translation transformation relationship between the two. Similarly, in LPT2 of S107, there is a mapping relationship between the rotation transformation in the Cartesian coordinate system and the translation transformation X in the x direction in the log-polar coordinate system. Therefore, reconversion may be performed again according to the mapping relationship between the Cartesian coordinate system and the log-polar coordinate system in S107 to obtain the scaling transformation relationship between the first image and the second image.

The above scaling transformation relationship is essentially a scale scale that the second image needs to be scaled to achieve registration with the first image. This scale may be used as part of the relative pose estimation.

Therefore, through the above steps, the rotation transformation relationship and the scaling transformation relationship between the first image and the second image are obtained.

In S109, corresponding rotation and scaling transformation is performed on the second image according to the rotation transformation relationship and the scaling transformation relationship obtained in S104 and S108 to obtain a new second image. After transformation through rotation and scaling, there is no difference in angle and scale between the first image and the second image. Therefore, currently, there is only the translation transformation relationship between the new second image and the inputted first image, and there is no rotation transformation relationship nor scaling transformation relationship between the two. Subsequently, it is only necessary to eliminate the translation difference between the two through translation transformation. For the translation transformation relationship, it only needs to be solved through phase correlation to obtain the translation transformation relationship in the x and y directions.

In S1010, a pre-trained fifth U-Net network U-Net5 and a sixth U-Net network U-Net6 are treated as two feature extractors, the first image and the new second image are treated as original input pictures of the two feature extractors U-Net5 and U-Net6, and isomorphic features in the two original input pictures are extracted to obtain a fifth feature map and a sixth feature map that are isomorphic. At this time, only the translation transformation relationship between the original input pictures are retained in the fifth feature map and the sixth feature map, and there are no rotation and scaling transformation relationships.

In S1011, phase correlation solution is performed on the fifth feature map and sixth feature map obtained in S1010 in the phase correlation layer (DC) to obtain the translation transformation relationship in the x direction between the first image and the second image.

In S1012, a pre-trained seventh U-Net network U-Net7 and an eighth U-Net network U-Net8 are treated as two feature extractors, the first image and the new second image are treated as original input pictures of the two feature extractors U-Net7 and U-Net8, and isomorphic features in the two original input pictures are extracted to obtain a seventh feature map and an eighth feature map that are isomorphic. At this time, only the translation transformation relationship between the original input pictures are retained in the seventh feature map and the eighth feature map, and there are no rotation and scaling transformation relationships.

In S1013, phase correlation solution is performed on the seventh feature map and the eighth feature map obtained in S1012 in the phase correlation layer (DC) to obtain the translation transformation relationship in the y direction between the first image and the second image.

The translation transformation relationship in the x direction and the translation transformation relationship in the y direction are essentially the distance X that needs to be translated in the x direction and the distance Y that needs to be translated in the y direction to achieve registration of the second image with the first image. These two distances may also be used as part of the relative pose estimation.

It can be seen that the pose estimation of the disclosure is implemented in two stages, and a total of four degrees of freedom (X, Y, theta, and scale) estimated values are obtained. First, the rotation and scaling transformation relationships are estimated through the rotation and scaling stages of S101 to S109, and then the translation transformation relationship is estimated through the translation stages of S1010 to S1013.

Combining the results of S104, S108, S1011, and S1013 above, the pose estimation values of the three transformation relationships of rotation, scaling, and translation between the heterogeneous first image and the second image may be obtained. In this way, the pose estimation process of the two is completed, and the loss function L may be calculated subsequently based on the corresponding estimated values.

It should be noted that in the abovementioned differentiable pose solver, the 8 U-Net networks are pre-trained. In order to ensure that each U-Net network can precisely extract isomorphic features, a reasonable loss function needs to be set. The total loss function of the training shall be a weighted sum of a rotation transformation relationship loss, a scaling transformation relationship loss, a translation transformation relationship loss in the x direction, and a translation transformation relationship loss in the y direction between the first image and the second image. The specific weighted value may be adjusted according to actual conditions.

In this embodiment, the weighted weights of the four losses in the total loss function are all 1, and all four losses use L1 loss. The four loss functions are as follows.

The rotation relationship theta predicted in S104 is denoted as theta_predict, the scaling relationship scale predicted in S108 is denoted as scale_predict, the translation transformation X in the x direction predicted in S1011 is denoted as x_predict, and the translation transformation Y predicted in the y direction in S1013 is denoted as y_predict. Therefore, during each round of training, the translation (x_predict and y_predict), rotation (theta_predict), and scaling (scale_predict) relationships between two heterogeneous pictures are obtained.

1) In the model, a 1-norm distance loss is performed between the obtained theta_predict and its true value theta_gt, $L\_theta=(theta\_gt-theta\_predict)$, and L_theta is returned to train U-Net1 and U-Net2, so that it can extract better features for obtaining theta_predict.

2) A 1-norm distance loss is performed between the obtained scale_predict and its true value scale_gt, $L\_scale=(scale\_gt-scale\_predict)$, and L_scale is returned to train U-Net3 and U-Net4, so that it can extract better features for obtaining scale_predict.

3) A 1-norm distance loss is performed between the obtained x_predict and its true value x_g, $L\_x=(x\_gt-x\_predict)$, and L_x is returned to train U-Net5 and U-Net6, so that it can extract better features for obtaining x_predict.

4) A 1-norm distance loss is performed between the obtained y_predict and its true value y_gt, $L\_y=(y\_gt-y\_predict)$, and L_y is returned to train U-Net7 and U-Net8, so that it can extract better features for obtaining y_predict.

Therefore, the total loss function is $L^*=L\_x+L\_y+L\_theta+L\_scale$. During the training process, the model parameters of the eight U-Net networks are optimized through the gradient descent method to minimize the total loss function $L^*$. The eight U-Net networks after training form a differentiable pose solver for pose estimation of actual heterogeneous images. This differentiable pose solver can perform pose estimation of two heterogeneous images according to the abovementioned method S101 to S1013. It should be noted that the training of this differentiable pose solver needs to precede the training of the aforementioned generative adversarial network.

Based on the introduction of the abovementioned differentiable pose solver, in order to verify the effect of the weakly matched image style transfer method provided in S1 to S4 above, three different image sample pairs are acquired under the three different weather difference settings shown in FIG. 4 in the disclosure, so that the three original data sets in FIG. 4 is formed. Based on these three original data sets, the aforementioned generative adversarial network of the disclosure is trained. Next, a vehicle recognition network and a road segmentation network are trained on sunny days, and precision of the vehicle recognition network and the road segmentation network is tested on rainy days, nights, foggy days, and their corresponding sunny days obtained through style transfer. The test results are shown in Table 1, where mAP is mean average precision and IoU is an overlapping area. The specific test method is provided as follows. 1) Vehicle recognition: in a data set containing 1,000 groups of weakly matched images (each group contains a sunny day and its corresponding weakly matched pictures with rainy, foggy, and night weather conditions), the vehicle recognition network trained with YOLOv3 in sunny days performs vehicle recognition in images under seven weather conditions: i) sunny day, ii) rainy day, iii) rainy day moving to sunny day, iv) foggy day, v) foggy day moving to sunny day, vi) night, and vii) night moving to sunny day. The mean average precision (mAP) of vehicle recognition under different conditions is obtained. 2) Road segmentation: in a data set containing 1,000 groups of weakly matched images (each group contains a sunny day and its corresponding weakly matched pictures with rainy, foggy, and night weather conditions), the vehicle recognition network trained with KittiSeg in sunny days performs road segmentation in images under seven weather conditions: i) sunny day, ii) rainy day, iii) rainy day moving to sunny day, iv) foggy day, v) foggy day moving to sunny day, vi) night, and vii) night moving to sunny day. The percentage of successful segmentation areas IoU (intersection over union) under different conditions is obtained.

TABLE 1

| | Vehicle recognition (mAP %) | Road segmentation (IoU %) |
|---|---|---|
| Sunny day | 99.8 | 99.1 |
| Rainy day | 20.1 | 41.2 |
| Rainy day moving to sunny day | 97.6 | 98.3 |
| Foggy day | 12.1 | 16.9 |
| Foggy day moving to sunny day | 98.2 | 96.4 |
| Night | 58.4 | 21.8 |
| Night moving to sunny day | 98.2 | 95.5 |

It thus can be seen that in the weakly matched image style transfer method provided by the disclosure, the style transfer may be well achieved while the pose in the image is kept unchanged.

Compared to the related art, the disclosure exhibits the following beneficial effects:

First, the method is suitable for style transfer of weakly paired images, different styles of pictures having certain overlap are used to perform model training of an adversarial neural network, so that the model is insensitive to poses and focuses on style learning, and therefore, in an actual application process, a source style can be converted into a target style, but a pose is kept unchanged. Style transfer of weakly paired data can be achieved, and thus support is provided for robot self-positioning technology.

Second, in the model training process of the adversarial neural network, a differentiable pose solver capable of estimating a relative pose of any two images is introduced in the disclosure. This differentiable pose solver optimizes the phase correlation algorithm to be differentiable and embeds it into an end-to-end learning network framework to achieve pose estimation. This differentiable pose solver can find the optimal feature extractor for image matching results, can obtain the solution without detailed evaluation, and has good interpretability and generalization capabilities.

The above-described embodiments are only preferred solutions of the disclosure, but the embodiments are not intended to limit the disclosure. A person having ordinary skill in the art can also make various changes and modifications without departing from the spirit and scope of the disclosure. Therefore, any technical solutions obtained by equivalent substitution or equivalent transformation fall within the protection scope of the disclosure.

What is claimed is:

1. A weakly paired image style transfer method based on a pose self-supervised generative adversarial network, the following steps are provided:

S1: obtaining an original data set consisting of image sample pairs, each image sample pair comprising a first source image $O_1$ and a first target image $T_1$ that have both a pose difference and a style difference;

S2: for each image sample pair in the original data set, performing three-degree-of-freedom transformation $P_r$ respectively on the first source image $O_1$ and the first target image $T_1$, generating a second source image $O_2$ and a second target image $T_2$, respectively, and forming a sample combination consisting of four images, wherein the three-degree-of-freedom transformation $P_r$ comprises three randomly generated pose transformations comprising horizontal and vertical translation and rotation, and the three-degree-of-freedom transformation $P_R$ adopted by the first source image $O_1$ and the first target image $T_1$ in the same image sample pair remains the same;

S3: inputting the sample combination in the original data set as a training sample into a generative adversarial network, performing style transformation on the first source image $O_1$ and the second source image $O_2$ respectively by the generative adversarial network to generate a third target image $FakeT_1$ and a fourth target image $FakeT_2$, and training the generative adversarial network by minimizing a total loss function of the inputted training sample, so as to obtain a weakly paired image style transfer network, wherein in the total loss function, a loss function L of a single training sample consists of three parts:

$$L=L_D+L_S+L_M,$$

where a loss of a first part is $L_D=(T_1-FakeT_1)+(T_2-FakeT_2)$, a loss of a second part is $L_S=P_3-P_4$, and a loss of a third part is $L_M=P_r-P_e$, in the formula: $P_3$ is a relative pose between the third target image $FakeT_1$ and the first target image $T_1$, $P_4$ is a relative pose between the fourth target image $FakeT_2$ and the second target image $T_2$, and P e is a relative pose between the third target image $FakeT_1$ and the fourth target image $FakeT_2$; and S4: inputting an image to be stylized into the weakly paired image style transfer network to obtain a stylized image having an unchanged pose.

2. The weakly paired image style transfer method based on the pose self-supervised generative adversarial network according to claim 1, wherein the images in the original data set are all bird's-eye views of a running path of a robot.

3. The weakly paired image style transfer method based on the pose self-supervised generative adversarial network according to claim 2, wherein a method of constructing the original data set is as follows:

(1): in a first image acquisition environment, acquiring a first bird's-eye view at a random location A on the running path of the robot;

(2): applying random translation to the random location A to obtain a random location B in a second image acquisition environment different from the first image acquisition environment, randomly applying horizontal rotation to an acquisition viewing angle and then acquiring a second bird's-eye view at the random location B again;

(3): respectively treating the acquired first bird's-eye view and the second bird's-eye view as the first source image $O_1$ and the first target image $T_1$ to construct one image sample pair; and continuously repeating (1), (2) and (3) to obtain a series of image sample pairs to construct the original data set.

4. The weakly paired image style transfer method based on the pose self-supervised generative adversarial network according to claim 3, wherein a difference between the first image acquisition environment and the second image acquisition environment is that the weather is different or sensors used to acquire images are different.

5. The weakly paired image style transfer method based on the pose self-supervised generative adversarial network according to claim 3, wherein the original data set is constructed by obtaining a bird's-eye view in a simulation environment.

6. The weakly paired image style transfer method based on the pose self-supervised generative adversarial network according to claim 1, wherein the relative pose between any two images is solved by a differentiable pose solver.

7. The weakly paired image style transfer method based on the pose self-supervised generative adversarial network according to claim 6, wherein the differentiable pose solver comprises 8 different U-Net networks, and the steps for image pose estimation of a first image and a second image in a differentiable pose solver are as follows:

S101: treating a pre-trained first U-Net network and a second U-Net network as two feature extractors, treating the first image and the second image as original input pictures of the two feature extractors, and extracting isomorphic features in the two original input pictures to obtain a first feature map and a second feature map that are isomorphic;

S102: performing Fourier transform on the first feature map and the second feature map obtained in S101 and then obtaining their amplitude spectra;

S103: performing log-polar coordinate transformation on the two amplitude spectra obtained in S102, so that the amplitude spectra are converted from a Cartesian coordinate system to a log-polar coordinate system, and that rotation transformation in the Cartesian coordinate system between the two amplitude spectra is mapped to translation transformation in a y direction in the log-polar coordinate system;

S104: performing phase correlation solution on the amplitude spectra after the coordinate transformation between the two in S103 to obtain a translation transformation relationship between the two and performing reconversion according to the mapping relationship between the Cartesian coordinate system and the log-polar coordinate system in S103 to obtain a rotation transformation relationship between the first image and the second image;

S105: treating a pre-trained third U-Net network and a fourth U-Net network as two feature extractors, treating the first image and the second image as original input pictures of the two feature extractors, and extracting isomorphic features in the two original input pictures to obtain a third feature map and a fourth feature map that are isomorphic;

S106: performing Fourier transform on the third feature map and the fourth feature map obtained in S105 and then obtaining their amplitude spectra;

S107: performing log-polar coordinate transformation on the two amplitude spectra obtained in S106, so that the amplitude spectra are converted from the Cartesian coordinate system to the log-polar coordinate system, and that scaling transformation in the Cartesian coordinate system between the two amplitude spectra is mapped to translation transformation in a x direction in the log-polar coordinate system;

S108: performing phase correlation solution on the amplitude spectra after the coordinate transformation between the two in S107 to obtain the translation transformation relationship between the two and performing reconversion according to the mapping relationship between the Cartesian coordinate system and the log-polar coordinate system in S107 to obtain a scaling transformation relationship between the first image and the second image;

S109: performing corresponding rotation and scaling transformation on the second image according to the rotation transformation relationship and the scaling transformation relationship obtained in S104 and S108 to obtain a new second image;

S1010: treating a pre-trained fifth U-Net network and a sixth U-Net network as two feature extractors, treating the first image and the new second image as original input pictures of the two feature extractors, and extracting isomorphic features in the two original input pictures to obtain a fifth feature map and a sixth feature map that are isomorphic;

S1011: performing phase correlation solution on the fifth feature map and sixth feature map obtained in S1010 to obtain the translation transformation relationship in the x direction between the first image and the second image;

S1012: treating a pre-trained seventh U-Net network and an eighth U-Net network as two feature extractors, treating the first image and the new second image as original input pictures of the two feature extractors, and extracting isomorphic features in the two original input pictures to obtain a seventh feature map and an eighth feature map that are isomorphic and only retain the translation transformation relationship between the original input pictures; and S1013: performing phase correlation solution on the seventh feature map and eighth feature map obtained in S1012 to obtain the translation transformation relationship in the y direction between the first image and the second image and completing relative pose estimation between the first image and the second image comprising the three transformation relationships of rotation, scaling, and translation.

8. The weakly paired image style transfer method based on the pose self-supervised generative adversarial network according to claim 7, wherein in the differentiable pose solver, the 8 U-Net networks are trained in advance, and the total loss function of the training is a weighted sum of a rotation transformation relationship loss, a scaling transformation relationship loss, a translation transformation relationship loss in the x direction, and a translation transformation relationship loss in the y direction between the first image and the second image.

9. The weakly paired image style transfer method based on the pose self-supervised generative adversarial network according to claim 1, wherein the original data set is inputted into the generative adversarial network in batches for training.

10. The weakly paired image style transfer method based on the pose self-supervised generative adversarial network according to claim 1, wherein the generative adversarial network uses an ADAM optimizer to perform gradient descent during a training process to optimize a network parameter.

* * * * *